United States Patent [19]

Sadorus

[11] Patent Number: 4,541,188
[45] Date of Patent: Sep. 17, 1985

[54] REFLECTIVE AUDIO ASSEMBLY AND PICTURE

[75] Inventor: George P. Sadorus, Decatur, Ill.

[73] Assignee: Talkies International Corp., Decatur, Ill.

[21] Appl. No.: 463,978

[22] Filed: Feb. 4, 1983

[51] Int. Cl.⁴ .......................... A47G 1/06; G09F 1/12
[52] U.S. Cl. ..................................... 40/152.1; 40/455; 40/906
[58] Field of Search ........................ 40/152, 152.1, 455, 40/906, 456, 312, 10 D; 381/24, 124, 28, 64, 88, 90; 179/146 E; 181/152, 155, 156, 150, 175, 182, 185, 189, 191, 199

[56] References Cited

U.S. PATENT DOCUMENTS

| | | | |
|---|---|---|---|
| 3,554,314 | 1/1971 | Schneidewind | 181/190 |
| 3,857,191 | 12/1974 | Sadorus | 40/455 |
| 3,928,928 | 12/1975 | Kalust | 40/455 |
| 4,138,594 | 2/1979 | Klipsch | 181/152 |

FOREIGN PATENT DOCUMENTS

| | | | |
|---|---|---|---|
| 953677 | 12/1949 | France | 181/185 |
| 988848 | 8/1951 | France . | |
| 247361 | 2/1926 | United Kingdom . | |
| 322177 | 11/1929 | United Kingdom . | |

Primary Examiner—Robert P. Swiatek
Assistant Examiner—Cary E. Stone
Attorney, Agent, or Firm—Lockwood, Alex, Fitzgibbon & Cummings

[57] ABSTRACT

A reflective audio assembly and picture frame defines a personalized audio visual combination. The frame displays a picture and a housing supports the frame in a substantially upright condition on a planar surface such as a table. The housing includes a sound receiving enclosure for receiving the sound from a speaker of a tape sound reproducing assembly which may also be contained in the housing. The sound receiving enclosure includes a front wall having an opening therein which is directed towards the front of the picture and downwardly to deflect the sound toward the planar surface upon which the combination is supported to enhance the tonal and directional qualities of the sound.

24 Claims, 4 Drawing Figures

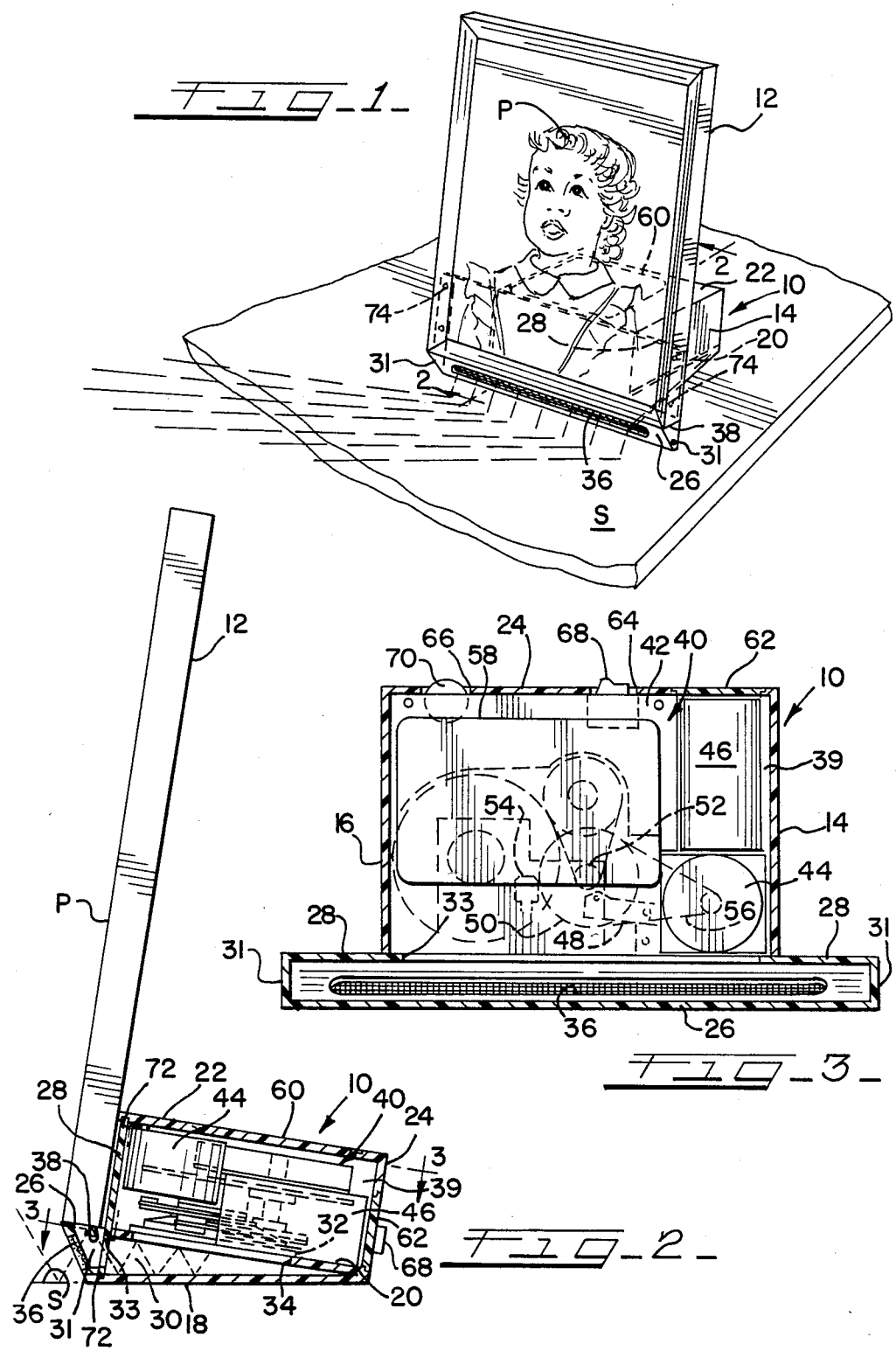

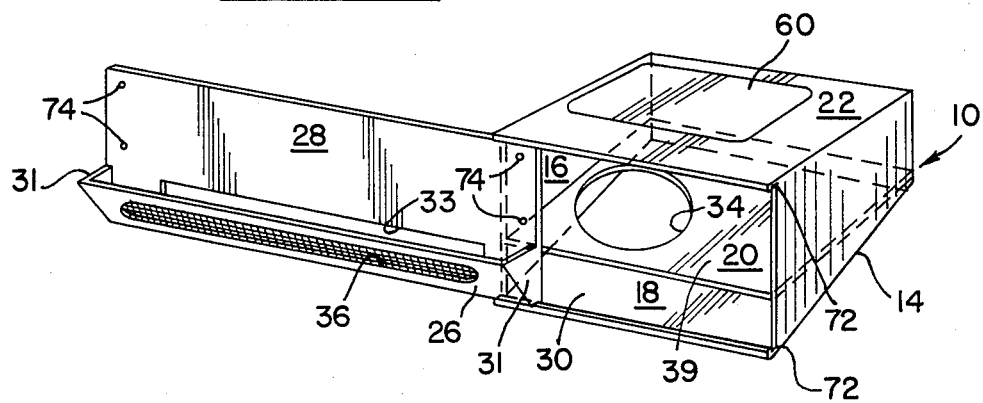

REFLECTIVE AUDIO ASSEMBLY AND PICTURE

BACKGROUND AND SUMMARY OF THE INVENTION

The present invention relates to a reflective audio assembly and combination of such assembly with a picture frame.

Various audio visual combinations have been proposed in the past in which a picture, for example of a person, is displayed in a picture frame which is associated with some form of sound reproducing means which is capable of playing back a personalized audio message from the person shown in the picture. One such combination is shown, by way of example, in my prior U.S. Pat. No. 3,857,191. In that Letters Patent several embodiments of picture frame and sound reproducing mechanisms capable of reproducing utterances by the person displayed in the picture are disclosed. In general, each of these embodiments includes the combination of a picture frame which receives and displays a personal picture and a housing associated with the frame which contains certain specific audio playback mechanisms for playing back the personalized message through a speaker in the housing. The speaker may either be directed to the front of the frame or the sides or the rear of the housing. In each of these embodiments, the speaker is located directly behind perforations, either in the frame itself or in the housing.

In a reflective audio assembly and personalized audio visual combination incorporating the principles of the present invention, the quality of the sound emanating from the assembly or combination is substantially enhanced and improved and is more natural and realistic than in audio visual combinations of the prior art. In a reflective audio assembly and personalized audio visual combination incorporating the principles of the present invention, the sound is first introduced to a sound receiving enclosure in which it reflects before being emitted toward the front of the assembly and beneath the picture and into contact with a planar surface, such as the table upon which the assembly is supported, all substantially enhancing the tonal and directional qualities of the sound. A reflective audio assembly and personalized audio visual combination incorporating the principles of the present invention may be self supporting, may house the sound reproducing components needed to reproduce the audio desired, and may provide rapid and easy access to such components either for maintenance or use.

In one principal aspect of the present invention, a reflective audio assembly comprises a housing having a top wall, a bottom wall, side walls and a front wall and these walls define a sound receiving enclosure. Support means supports the enclosure on a substantially planar surface and means for mounting a sound speaker are provided so as to direct the sound from the speaker into the enclosure at a location spaced from the front wall of the enclosure. The front wall has an opening therein which includes sound deflecting means which deflects the sound which leaves the opening from the enclosure downwardly toward the surface upon which the housing is supported.

In another principal aspect of the present invention, the front wall is inclined at an obtuse angle relative to the bottom wall of the housing to deflect the sound which leaves the opening downwardly toward the planar surface upon which the housing is supported.

In still another principal aspect of the present invention, the assembly includes picture frame means and the frame means defines at least a portion of the top wall of the sound receiving enclosure.

In still another principal aspect of the present invention, the front wall opening of the aforementioned assemblies is adjacent the bottom of the picture frame means.

In still another principal aspect of the present invention, in the aforementioned assemblies, a second enclosure may be provided adjacent the sound receiving enclosure, the second enclosure may be defined at least in part by one of the aforementioned walls and the second enclosure contains sound reproducing means.

In still another principal aspect of the present invention, a personalized audio visual combination of a picture receiving frame and housing is provided. The frame includes means for receiving and displaying a picture. The housing supports the frame on a substantially planar surface for display of the picture and the housing includes a plurality of walls defining a sound receiving enclosure including a front wall adjacent the bottom of the frame. Means is provided for mounting a sound speaker to direct the sound from the speaker into the enclosure at a location spaced from the front wall of the housing and an opening in the front wall includes sound deflecting means which deflects the sound which leaves the opening from the enclosure in the direction in which the picture is displayed and downwardly toward the planar surface upon which the combination is supported.

In still another principal aspect of the present invention, in the aforementioned combination, the opening is beneath the picture frame.

These and other objects, features and advantages of the present invention will be clearly understood through a consideration of the following detailed description.

BRIEF DESCRIPTION OF THE DRAWINGS

In the course of this description, reference will frequently be made to the attached drawings in which:

FIG. 1 is an overall, perspective view of a personalized audio visual combination incorporating the principles of the present invention supported upon a flat surface, such as a table top;

FIG. 2 is a cross-sectioned, side elevational view of the combination shown in FIG. 1 and showing the housing thereof in cross-section as viewed substantially along line 2—2 of FIG. 1;

FIG. 3 is a cross-sectioned plan view of the housing as viewed substantially along line 3—3 of FIG. 2; and FIG. 4 is an overall perspective view of the housing from which the picture and sound reproducing components have been removed for purposes of clarity and in which the front wall of the housing is partially laterally displaced for access to the interior of the housing.

DESCRIPTION OF THE PREFERRED EMBODIMENTS

The present invention is directed to a reflective audio housing, generally 10, and the combination thereof with a picture frame, generally 12, as shown in FIG. 1.

The housing 10 generally comprises a pair of side walls 14 and 16, as shown in FIGS. 3 and 4, a bottom wall 18, as shown in FIGS. 2 and 4, an intermediate wall 20 which is angled relative to the bottom wall 18, as also shown in FIGS. 2 and 4, a top wall 22 and a rear wall 24. The housing also includes a pair of front walls 26 and 28, as shown in FIGS. 2–4. The front wall 26 extends upwardly from the bottom wall 18 at an obtuse angle, as best viewed in FIG. 2 and as will be described in more detail to follow.

The intermediate wall 20 defines the top wall of a sound receiving enclosure 30, as shown in FIG. 2, together with the side walls 14 and 16, the bottom wall 18 and the front wall 26, the lower front of the front wall and a pair of generally triangular front side walls 31. The sound receiving enclosure 30 receives the sound which is transmitted by a conventional speaker 32, as shown in FIG. 2. As shown in FIGS. 2 and 4, the speaker 32 is preferably mounted adjacent wall 20 in overlying relationship to and facing an opening 34 in that wall and in spaced relationship to the obtusely angled front wall 26. Front wall 28 includes an enlarged opening 33 adjacent its bottom beneath wall 20 and facing the front of the assembly to allow sound, as shown by the dotted lines in FIG. 2, to leave the sound receiving enclosure 30. Before the sound passes from the portion of the sound receiving enclosure 30 underlying the speaker to the obtusely angled front wall 26, it is repeatedly reflected within the sound receiving enclosure. Following several such reflections, the sound leaves an elongate opening 36 in wall 26 so as to emanate frontally beneath the picture P which is displayed in the frame 12 and is deflected downwardly against the surface S of the table or other substantially planar surface upon which the combination is supported due to the obtuse angle of the front wall 26 and its opening 36. Thereby, the quality of the sound, both from the standpoint of tone as well as direction, is substantially enhanced to the listener who is positioned in front of the picture P. The quality of the sound is additionally enhanced due to the reflection which takes place within the sound receiving enclosure 30 prior to the sound emanating downwardly from the elongate opening 36.

It will be seen that a portion of the top wall of the sound receiving enclosure 30 prior to discharge of the sound from opening 36 may be defined by the bottom 38 of the picture frame 12, as shown in FIG. 2.

The bottom wall 18 also preferably defines a support for the housing 10 and picture frame 12 such that the housing 10 supports the frame in use. For this reason, the wall 28 is preferably somewhat inclined so as to support the frame upright, but at a slightly reversed incline for ease of viewing. It will be understood that the bottom wall 18 may support the assembly directly on its bottom planar surface or upon feet or other elements which may be mounted upon or otherwise attached to the bottom wall 18.

The top wall 22 and lower intermediate wall 20, together with the upper portions of the side walls 14 and 16, the rear wall 24 and the front wall 28 define a sound reproducing enclosure 39 for receiving the speaker 32, as well as the sound reproducing means, generally 40, of the invention, as best shown in FIGS. 2 and 3. By way of example, the sound reproducing means 40 may include a magnetic audio tape cassette playback assembly which, in addition to the speaker 32, may comprise a cassette playback chassis 42, a motor 44, a battery 46, a pinch roller assembly 48, a fly wheel 50, a capstan 52, a playback or record/playback head 54, a drive belt 56, a conventional audio cassette 58 and other components of a cassette playback or record/playback assembly. The particular details of such cassette assembly are not part of the present invention and may be readily selected by those skilled in the art after considering the foregoing description of the invention.

It will thus be seen that the intermediate wall 20 of the housing 10 constitutes a major portion of the top wall of the sound receiving enclosure 30 and also the bottom wall of the sound reproducing enclosure 39 which contains the sound reproducing means 40. The speaker 32 is mounted adjacent intermediate wall 20 and is positioned to direct the sound through the speaker opening 34 and into the sound receiving enclosure 30 for reflection therein. Thus, the housing 10 provides an integral unit which contains both the sound receiving enclosure 30 and the sound reproducing enclosure 39.

The top wall 22 may also include a removable cover or hatch 60, as shown in FIGS. 1, 2 and 4, for accessing the cassette 58. In addition, a removable cover or hatch 62 may also be provided, as shown in FIGS. 2 and 3, for replacement of the battery 46. Suitable openings 64 and 66 may also be positioned through one of the walls into the sound reproducing enclosure 39, for example in the back wall 24 as shown in FIG. 3, for access to an on-off switch 68 and volume control 70.

The front wall 28 is preferably mounted to the housing 10 such that it may be slidably removed to gain access to the sound reproducing enclosure 39 and sound reproducing means 40 for servicing of the latter. One manner in which this may be accomplished is shown in FIGS. 2 and 4 wherein the front wall 28, which is preferably of substantially the same width as that of the frame 12, may be slidably received in elongate grooves 72 in the top wall 22 and bottom wall 18 of the housing. The front wall 26 may be formed integrally with or attached to the bottom of wall 28, as best seen in FIG. 4. The opposite edges of the front wall 28 may include screw holes 74, as shown in FIGS. 1 and 4, by which the front wall 28 and its housing 10 may be attached to the rear of the frame 12 to form an integral combination therewith, with the frame 12 resting upon front wall 26 to form part of the top wall of the sound receiving enclosure 30.

With the foregoing description of the preferred embodiment in mind, the sound from speaker 32 is projected into the sound receiving enclosure 30 in which it is reflected several times, as shown by the dotted lines in FIG. 2, before it emanates from the opening 36 in the front wall 26 of the enclosure. As the sound emanates from the forward facing opening 36 it is further deflected downwardly due to the obtusely inclined opening 36 and its wall 26 so that the sound is reflected from the surface S upon which the combination rests and toward the listener who is viewing the picture P. Such reflections, both within the sound receiving enclosure 30 and off of the surface S, substantially improve both the tonal, particularly the bass tonal quality, as well as directional quality of the sound to give the impression that the picture itself is talking. Moreover, because the sound is directed into the sound receiving enclosure 30, rather than frontally from the frame, a larger speaker may be employed which is capable of reproducing better bass response.

It will be understood that the embodiment of the present invention which has been described is merely illustrative of one of the applications of the principles of the present invention. Numerous modifications may be made by those skilled in the art without departing from the true spirit and scope of the invention.

What is claimed is:

1. A reflective audio visual assembly comprising:
a housing including a top wall, a bottom wall, side walls and a front wall, said walls defining a sound receiving enclosure;
support means for supporting said enclosure on a substantially planar surface;
means for mounting a sound speaker to direct the sound from said speaker into said enclosure at a location spaced from the front wall;
an opening in said front wall, said opening including sound deflecting means which deflects the sound which leaves said opening from said enclosure downwardly toward the planar surface upon which said housing is supported; and
picture frame means, said frame means defining at least a portion of said top wall.

2. The assembly of claim 1, wherein said top wall and bottom wall are inclined relative to each other such that they are nearer each other at their edges opposite said front wall.

3. The assembly of claim 1, wherein said means for mounting said speaker comprises an opening in one of said walls adjacent which the speaker is mounted outside of said sound receiving enclosure.

4. The assembly of claim 3, wherein said last mentioned opening is in said top wall.

5. The assembly of claim 1, wherein said front wall is inclined at an obtuse angle relative to said bottom wall to deflect the sound which leaves said opening downwardly toward the planar surface upon which said housing is supported.

6. The assembly of claim 5, wherein said opening in said front wall is beneath said picture frame means.

7. The assembly of claim 6, wherein said housing supports said picture frame means on the planar surface.

8. The assembly of claim 1, wherein said opening in said front wall is beneath said picture frame means.

9. The assembly of claim 8, wherein said housing supports said picture frame means on the planar surface.

10. The assembly of claim 1, including a second enclosure adjacent said sound receiving enclosure, said second enclosure being defined at least in part by one of said walls, said second enclosure containing sound reproducing means.

11. The assembly of claim 10, wherein said sound reproducing means comprises audio tape playback means and a speaker, said second enclosure is defined by at least a pair of walls including a bottom wall which is said top wall of said sound receiving enclosure, the other of said pair of walls including access means for the audio tape.

12. The assembly of claim 11, wherein said front wall is inclined at an obtuse angle relative to said bottom wall to deflect the sound which leaves said opening downwardly toward the planar surface upon which said housing is supported.

13. The assembly of claim 11, wherein said opening in said front wall is beneath said picture frame means.

14. The assembly of claim 13, wherein at least one of said housings support said picture frame means on the planar surface.

15. A personalized audio visual combination of a picture receiving frame and a housing,
said frame including means for receiving and displaying a picture;
said housing supporting said frame on a substantially planar surface for display of the picture, said housing comprising a plurality of walls defining a sound receiving enclosure and including a front wall adjacent the bottom of said frame;
means for mounting a sound speaker to direct the sound from said speaker into said enclosure at a location spaced from said front wall; and
an opening in said front wall, said opening including sound deflecting means which deflects the sound which leaves said opening from said enclosure in the direction in which the picture is displayed and downwardly toward the planar surface upon which said combination is supported.

16. The combination of claim 15, wherein said housing includes a bottom wall and said front wall is inclined at an obtuse angle relative to said bottom wall to deflect the sound which leaves said opening downwardly toward the planar surface upon which said combination is supported.

17. The combination of claim 16, wherein said picture frame defines at least a portion of said sound receiving enclosure.

18. The combination of claim 15, including a second enclosure adjacent said sound receiving enclosure, said second enclosure being defined at least in part by one of said walls, said second enclosure containing sound reproducing means.

19. The combination of claim 18, wherein said sound reproducing means comprises audio tape playback means and a speaker, said second enclosure is defined by at least a pair of walls including a bottom wall which also constitutes a top wall of said sound receiving enclosure, the other of said pair of walls including access means for the audio tape.

20. The combination of claim 18, wherein said front wall is inclined at an obtuse angle relative to said bottom wall to deflect the sound which leaves said opening downwardly toward the planar surface upon which said housing is supported, and said picture frame defines at least a portion of said sound receiving enclosure.

21. The combination of claim 20, wherein said opening is beneath said picture frame.

22. The combination of claim 15, wherein said opening is beneath said picture frame.

23. A personalized audio visual combination; said combination comprising:
a picture receiving frame including means for receiving and displaying a picture;
support means for supporting said frame on a substantially planar surface for display of the picture;
a housing on said frame including a front wall adjacent the bottom of said frame;
means for mounting a sound speaker to direct the sound from said speaker into said housing and toward said front wall; and
an opening in said front wall, said front wall with said opening being inclined at an obtuse angle relative to the planar surface upon which said frame is supported to deflect the sound which leaves said opening from said sound speaker in the direction in which the picture is displayed and downwardly toward the planar surface upon which said frame is supported.

24. A personalized audio visual combination; said combination comprising:
a picture receiving frame including means for receiving and displaying a picture;
support means for supporting said frame on a substantially planar surface for display of the picture;

a housing on said frame including a front wall adjacent the bottom of said frame;

means for mounting a sound speaker to direct the sound from said speaker into said housing and toward said front wall; and an opening in said front wall, said front wall and said opening being positioned beneath said frame, said opening being positioned to deflect the sound which leaves said opening from said sound speaker in the direction in which the picture is displayed and downwardly toward the planar surface upon which said frame is supported.

* * * * *